(12) United States Patent
Mamrak et al.

(10) Patent No.: US 12,005,637 B2
(45) Date of Patent: Jun. 11, 2024

(54) GAS FLOW SYSTEMS FOR AN ADDITIVE MANUFACTURING MACHINE

(71) Applicant: General Electric Company, Schenectady, NY (US)

(72) Inventors: Justin Mamrak, Loveland, OH (US); Mackenzie Ryan Redding, Mason, OH (US)

(73) Assignee: General Electric Company, Schenectady, NY (US)

( * ) Notice: Subject to any disclaimer, the term of this patent is extended or adjusted under 35 U.S.C. 154(b) by 299 days.

(21) Appl. No.: 16/761,632

(22) PCT Filed: Nov. 2, 2018

(86) PCT No.: PCT/US2018/058880
§ 371 (c)(1),
(2) Date: May 5, 2020

(87) PCT Pub. No.: WO2019/094283
PCT Pub. Date: May 16, 2019

(65) Prior Publication Data
US 2021/0170494 A1 Jun. 10, 2021

Related U.S. Application Data

(60) Provisional application No. 62/584,149, filed on Nov. 10, 2017.

(51) Int. Cl.
*B29C 64/153* (2017.01)
*B22F 10/32* (2021.01)
(Continued)

(52) U.S. Cl.
CPC ............ *B29C 64/153* (2017.08); *B22F 10/32* (2021.01); *B22F 10/322* (2021.01); *B22F 10/50* (2021.01);
(Continued)

(58) Field of Classification Search
CPC ........ B22F 10/50; B22F 12/70; B29C 64/371; B33Y 10/00; B33Y 30/00; B33Y 50/00; B33Y 50/02
See application file for complete search history.

(56) References Cited

U.S. PATENT DOCUMENTS 6,007,318 A 12/1999 Russell et al.
7,020,539 B1 3/2006 Kovacevic et al.
(Continued)

FOREIGN PATENT DOCUMENTS

DE 102015109846 A1 12/2016

OTHER PUBLICATIONS

PCT International Search Report Corresponding to PCT/US2018/058880 dated Feb. 12, 2019.

*Primary Examiner* — Ryan M Ochylski
(74) *Attorney, Agent, or Firm* — Dority & Manning, P.A.

(57) ABSTRACT

An additive manufacturing machine (900) includes a plurality of subsystems, such as a condensate evacuation subsystem (940) for removing byproducts of the additive manufacturing products near a powder bed, a closed loop subsystem (960) for cleaning contaminants from sensitive machine components (964), and/or an electronics cooling subsystem (984) for cooling an electronics compartment (980). Each subsystem (940, 960, 984) may include a dedicated gas circulation loop (942, 966, 986) that is operably coupled to a gas circulation device (944, 968, 988) for urging a clean flow of gas (946, 962, 990) to each of the subsystems (940, 960, 984) to perform a particular function.

19 Claims, 9 Drawing Sheets

(51) Int. Cl.
    *B22F 10/322* (2021.01)
    *B22F 10/50* (2021.01)
    *B22F 12/00* (2021.01)
    *B22F 12/20* (2021.01)
    *B22F 12/49* (2021.01)
    *B22F 12/70* (2021.01)
    *B29C 64/371* (2017.01)
    *B33Y 10/00* (2015.01)
    *B33Y 30/00* (2015.01)
    *B22F 10/14* (2021.01)
    *B22F 10/25* (2021.01)
    *B22F 10/28* (2021.01)
    *B22F 10/77* (2021.01)
    *B22F 12/67* (2021.01)

(52) U.S. Cl.
    CPC .............. *B22F 12/20* (2021.01); *B22F 12/22* (2021.01); *B22F 12/49* (2021.01); *B22F 12/70* (2021.01); *B29C 64/371* (2017.08); *B33Y 10/00* (2014.12); *B33Y 30/00* (2014.12); *B22F 10/14* (2021.01); *B22F 10/25* (2021.01); *B22F 10/28* (2021.01); *B22F 10/77* (2021.01); *B22F 12/67* (2021.01); *B22F 2201/02* (2013.01); *B22F 2201/11* (2013.01)

(56) References Cited

U.S. PATENT DOCUMENTS

| | | |
|---|---|---|
| 7,045,738 B1 | 5/2006 | Kovacevic et al. |
| 7,887,316 B2 | 2/2011 | Cox |
| 8,260,447 B2 | 9/2012 | Mattes et al. |
| 8,342,833 B2 | 1/2013 | Shi et al. |
| 9,376,272 B2 | 6/2016 | Sato et al. |
| 9,682,397 B2 | 6/2017 | Jakimov et al. |
| 9,731,450 B2 | 8/2017 | Echigo et al. |
| 10,682,701 B2 | 6/2020 | Wilkes et al. |
| 2003/0235635 A1 | 12/2003 | Fong et al. |
| 2011/0182027 A1 | 7/2011 | Lima et al. |
| 2011/0291331 A1 | 12/2011 | Scott |
| 2016/0059310 A1 | 3/2016 | Junker et al. |
| 2016/0136731 A1 | 5/2016 | McMurtry et al. |
| 2016/0193696 A1 | 7/2016 | McFarland et al. |
| 2016/0200053 A1 | 7/2016 | Chen et al. |
| 2017/0014905 A1 | 1/2017 | Kawada et al. |
| 2017/0036404 A1 | 2/2017 | Rengers et al. |
| 2017/0120538 A1 | 5/2017 | DeMuth et al. |
| 2017/0146382 A1 | 5/2017 | Gold et al. |
| 2018/0244034 A1 | 8/2018 | Sutcliffe et al. |

GAS FLOW SYSTEMS FOR AN ADDITIVE MANUFACTURING MACHINE

PRIORITY INFORMATION

The present applicant claims priority to U.S. Provisional Patent Application Ser. No. 62/584,149 titled "Gas Flow Systems for an Additive Manufacturing Machine" filed on Nov. 10, 2017, the disclosure of which is incorporated by reference herein.

FIELD

The present disclosure generally relates to methods and systems adapted to perform additive manufacturing (AM) processes, for example by direct melt laser manufacturing (DMLM), on a larger scale format.

BACKGROUND

Additive manufacturing (AM) processes generally involve the buildup of one or more materials to make a net or near net shape (NNS) object, in contrast to subtractive manufacturing methods. Though "additive manufacturing" is an industry standard term (ISO/ASTM52900), AM encompasses various manufacturing and prototyping techniques known under a variety of names, including freeform fabrication, 3D printing, rapid prototyping/tooling, etc. AM techniques are capable of fabricating complex components from a wide variety of materials. Generally, a freestanding object can be fabricated from a computer aided design (CAD) model.

A particular type of AM process uses an energy source such as an irradiation emission directing device that directs an energy beam, for example, an electron beam or a laser beam, to sinter or melt a powder material, creating a solid three-dimensional object in which particles of the powder material are bonded together. AM processes may use different material systems or additive powders, such as engineering plastics, thermoplastic elastomers, metals, and ceramics. Laser sintering or melting is a notable AM process for rapid fabrication of functional prototypes and tools. Applications include direct manufacturing of complex workpieces, patterns for investment casting, metal molds for injection molding and die casting, and molds and cores for sand casting. Fabrication of prototype objects to enhance communication and testing of concepts during the design cycle are other common usages of AM processes.

Selective laser sintering, direct laser sintering, selective laser melting, and direct laser melting are common industry terms used to refer to producing three-dimensional (3D) objects by using a laser beam to sinter or melt a fine powder. More accurately, sintering entails fusing (agglomerating) particles of a powder at a temperature below the melting point of the powder material, whereas melting entails fully melting particles of a powder to form a solid homogeneous mass. The physical processes associated with laser sintering or laser melting include heat transfer to a powder material and then either sintering or melting the powder material. Although the laser sintering and melting processes can be applied to a broad range of powder materials, the scientific and technical aspects of the production route, for example, sintering or melting rate and the effects of processing parameters on the microstructural evolution during the layer manufacturing process have not been well understood. This method of fabrication is accompanied by multiple modes of heat, mass and momentum transfer, and chemical reactions that make the process very complex.

During direct metal laser sintering (DMLS) or direct metal laser melting (DMLM), an apparatus builds objects in a layer-by-layer manner by sintering or melting a powder material using an energy beam. The powder to be melted by the energy beam is spread evenly over a powder bed on a build platform, and the energy beam sinters or melts a cross sectional layer of the object being built under control of an irradiation emission directing device. The build platform is lowered and another layer of powder is spread over the powder bed and object being built, followed by successive melting/sintering of the powder. The process is repeated until the part is completely built up from the melted/sintered powder material.

After fabrication of the part is complete, various post-processing procedures may be applied to the part. Post processing procedures include removal of excess powder by, for example, blowing or vacuuming. Other post processing procedures include a stress release process. Additionally, thermal and chemical post processing procedures can be used to finish the part.

Conventional AM machines include a single gas loop system that is configured for performing several functions within the machine. This gas loop system may be a closed or substantially closed system that includes a gas or other fluid and a circulation pump for circulating that gas within the gas loop. As an example, the gas loop system for conventional AM machines may be used to evacuate fumes, condensate, and other byproducts generated by the irradiation of additive powder. In addition, the same gas loop system may be used to supply purge air through one or more nozzles to sensitive components of the AM machine to clean those components and remove or reduce the build-up of contaminants which may affect the operation of the sensitive components. In addition, the same gas loop system may be used to cool an electronics compartment to keep the operation of electronic components below a desired temperature.

Notably, each of the subsystems described above may function best if the circulated gas is a particular type of gas having flow properties specific to that subsystem. For example, in order to cool electronics or provide evacuation of condensate from the build area, it may be desirable to flow a first gas at a low pressure and high flow rate. By contrast, in order to provide purge air to clean particular components of the AM machine, it may be desirable to flow a second gas at a high pressure and low flow rate. Moreover, using the flow of gas for one function may extract more particulates and require more filtering of the air than others which may require a different type of filter or no filter at all.

Accordingly, an AM machine with more versatile gas flow loops for performing various functions would be useful. More particularly, a gas flow system for an additive manufacturing machine that performs functions such as electronics cooling, condensate evacuation, and component cleaning with purge air, all at an improved efficiency and effectiveness, would be particularly beneficial.

BRIEF DESCRIPTION

Aspects and advantages will be set forth in part in the following description, or may be obvious from the description, or may be learned through practice of the invention.

According to one embodiment of the present subject matter, an additive manufacturing machine is provided. The additive manufacturing machine includes a build platform, a build unit, and a gantry positioned above the build platform and movably supporting the build unit within a build area. A condensate evacuation subsystem includes a condensate loop and a first gas circulation device operably coupled to the condensate loop for circulating a first gas through the build area. A closed loop subsystem includes a purge air loop and a second gas circulation device operably coupled to the purge air loop for circulating a second gas over at least one sensitive component of the additive manufacturing machine.

According to another exemplary embodiment, a method of operating an additive manufacturing machine is provided. The method includes circulating a first gas through a condensate loop and through a build area of the additive manufacturing machine and circulating a second gas through a purge air loop and past a sensitive component of the additive manufacturing machine for removing particulates.

According to still another exemplary embodiment, an additive manufacturing machine is provided. The additive manufacturing machine includes a plurality of subsystems and a plurality of gas circulation loops, each of the gas circulation loops being associated with only one of the plurality of subsystems.

These and other features, aspects and advantages will become better understood with reference to the following description and appended claims. The accompanying drawings, which are incorporated in and constitute a part of this specification, illustrate embodiments of the invention and, together with the description, serve to explain certain principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended Figs., in which.

Figure 1:
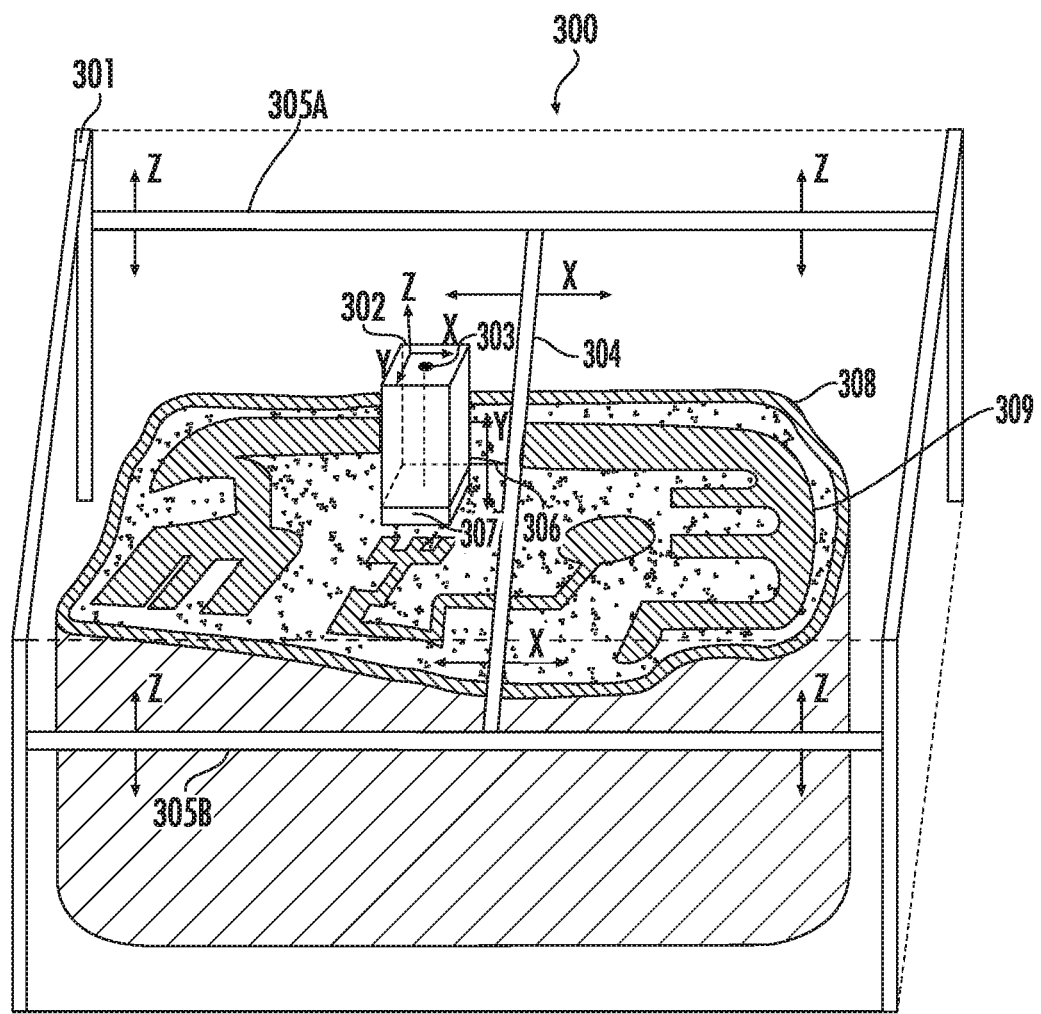
FIG. 1 shows a large scale additive manufacturing apparatus according to an embodiment of the invention.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components. In addition, the terms "upstream" and "downstream" refer to the relative direction with respect to fluid flow in a fluid pathway. For example, "upstream" refers to the direction from which the fluid flows, and "downstream" refers to the direction to which the fluid flows. Furthermore, as used herein, terms of approximation, such as "approximately," "substantially," or "about," refer to being within a ten percent margin of error.

An additive manufacturing machine is generally provided which includes a plurality of subsystems, such as a condensate evacuation subsystem for removing byproducts of the additive manufacturing products near a powder bed, a closed loop subsystem for cleaning contaminants from sensitive machine components, and/or an electronics cooling subsystem for cooling an electronics compartment. Each subsystem may include a dedicated gas circulation loop that is operably coupled to a gas circulation device for urging a clean flow of gas to each of the subsystems to perform a particular function.

FIG. 1 shows an example of one embodiment of a large-scale additive manufacturing apparatus 300 according to the present invention. The apparatus 300 comprises a positioning system 301, a build unit 302 comprising an irradiation emission directing device 303, a laminar gas flow zone 307, and a build plate (not shown in this view) beneath an object being built 309. The maximum build area is defined by the positioning system 301, instead of by a powder bed as with conventional systems, and the build area for a particular build can be confined to a build envelope 308 that may be dynamically built up along with the object. The gantry 301 has an x crossbeam 304 that moves the build unit 302 in the x direction. There are two z crossbeams 305A and 305B that move the build unit 302 and the x crossbeam 304 in the z direction. The x cross beam 304 and the build unit 302 are attached by a mechanism 306 that moves the build unit 302 in the y direction. In this illustration of one embodiment of the invention, the positioning system 301 is a gantry, but the present invention is not limited to using a gantry. In general, the positioning system used in the present invention may be any multidimensional positioning system such as a delta robot, cable robot, robot arm, etc. The irradiation emission directing device 303 may be independently moved inside of the build unit 302 by a second positioning system (not shown). The atmospheric environment outside the build unit, i.e. the "build environment," or "containment zone," is typically controlled such that the oxygen content is reduced relative to typical ambient air, and so that the environment is at reduced pressure.

There may also be an irradiation source that, in the case of a laser source, originates the photons comprising the laser beam irradiation is directed by the irradiation emission directing device. When the irradiation source is a laser source, then the irradiation emission directing device may be, for example, a galvo scanner, and the laser source may be located outside the build environment. Under these circumstances, the laser irradiation may be transported to the irradiation emission directing device by any suitable means, for example, a fiber-optic cable. According to an exemplary embodiment, irradiation emission directing device uses an optical control unit for directing the laser beam. An optical control unit may comprise, for example, optical lenses, deflectors, mirrors, and/or beam splitters. Advantageously, a telecentric lens may be used. When a large-scale additive manufacturing apparatus according to an embodiment of the present invention is in operation, if the irradiation emission directing devices directs a laser beam, then generally it is advantageous to include a gasflow device providing substantially laminar gas flow to a gasflow zone as illustrated in FIG. 1, 307 and FIG. 2, 404.

When the irradiation source is an electron source, then the electron source originates the electrons that comprise the e-beam that is directed by the irradiation emission directing device. An e-beam is a well-known source of irradiation. When the source is an electron source, then it is important to maintain sufficient vacuum in the space through which the e-beam passes. Therefore, for an e-beam, there is no gas flow across the gasflow zone (shown, for example at FIG. 1, 307). When the irradiation source is an electron source, then the irradiation emission directing device may be, for example, an electronic control unit which may comprise, for example, deflector coils, focusing coils, or similar elements.

The apparatus 300 allows for a maximum angle of the beam to be a relatively small angle $\Theta_2$ to build a large part, because (as illustrated in FIG. 1) the build unit 302 can be moved to a new location to build a new part of the object being formed 309. When the build unit is stationary, the point on the powder that the energy beam touches when $\Theta_2$ is 0 defines the center of a circle in the xy plane (the direction of the beam when $\Theta_2$ is approximately 0 defines the z direction), and the most distant point from the center of the circle where the energy beam touches the powder defines a point on the outer perimeter of the circle. This circle defines the beam's scan area, which may be smaller than the smallest cross sectional area of the object being formed (in the same plane as the beam's scan area). There is no particular upper limit on the size of the object relative to the beam's scan area.

In some embodiments, the recoater used is a selective recoater. One embodiment is illustrated in FIGS. 2 through 5.

Figure 2:
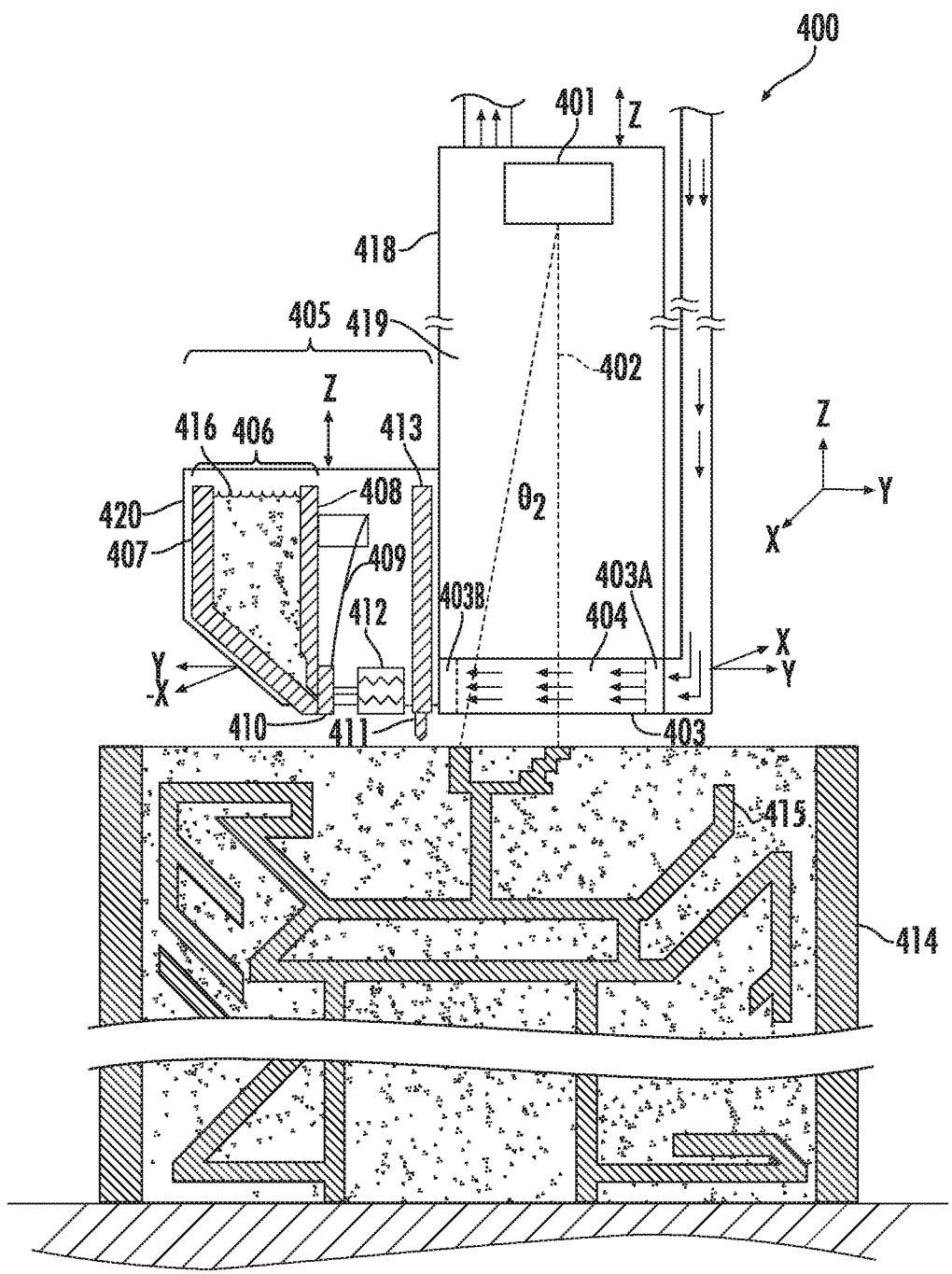
FIG. 2 shows a side view of a build unit according to an embodiment of the invention.

FIG. 2 shows a build unit 400 comprising an irradiation emission directing device 401, a gasflow device 403 with a pressurized outlet portion 403A and a vacuum inlet portion 403B providing gas flow to a gasflow zone 404, and a recoater 405. Above the gasflow zone 404 there is an enclosure 418 containing an inert environment 419. The recoater 405 has a hopper 406 comprising a back plate 407 and a front plate 408. The recoater 405 also has at least one actuating element 409, at least one gate plate 410, a recoater blade 411, an actuator 412, and a recoater arm 413. The recoater is mounted to a mounting plate 420. FIG. 2 also shows a build envelope 414 that may be built by, for example, additive manufacturing or Mig/Tig welding, an object being formed 415, and powder 416 contained in the hopper 405 used to form the object 415. In this particular embodiment, the actuator 412 activates the actuating element 409 to pull the gate plate 410 away from the front plate 408. In an embodiment, the actuator 412 may be, for example, a pneumatic actuator, and the actuating element 409 may be a bidirectional valve. In an embodiment, the actuator 412 may be, for example, a voice coil, and the actuating element 409 may be a spring. There is also a hopper gap 417 between the front plate 408 and the back plate 407 that allows powder to flow when a corresponding gate plate is pulled away from the powder gate by an actuating element. The powder 416, the back plate 407, the front plate 408, and the gate plate 410 may all be the same material. Alternatively, the back plate 407, the front plate 408, and the gate plate 410 may all be the same material, and that material may be one that is compatible with the powder material, such as cobalt-chrome. In this particular embodiment, the gas flow in the gasflow zone 404 flows in the y direction, but it does not have to. The recoater blade 411 has a width in the x direction. The direction of the irradiation emission beam when $\Theta_2$ is approximately 0 defines the z direction in this view. The gas flow in the gasflow zone 404 may be substantially laminar. The irradiation emission directing device 401 may be independently movable by a second positioning system (not shown). FIG. 2 shows the gate plate 410 in the closed position.

Figure 3:
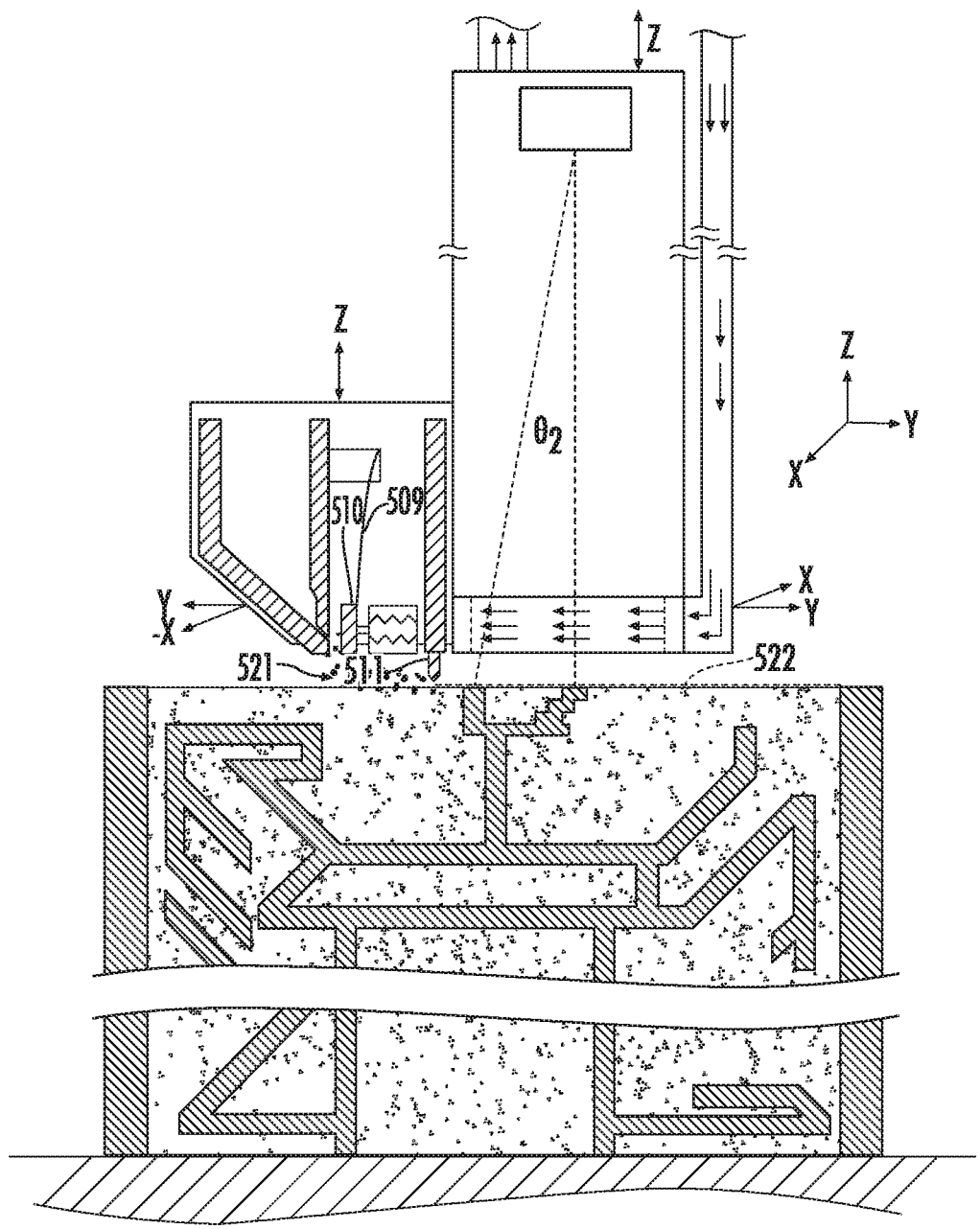
FIG. 3 shows a side view of a build unit dispensing powder according to an embodiment of the invention.

FIG. 3 shows the build unit of FIG. 2, with the gate plate 410 in the open position (as shown by element 510) and actuating element 509. Powder in the hopper is deposited to make fresh powder layer 521, which is smoothed over by the recoater blade 511 to make a substantially even powder layer 522. In some embodiments, the substantially even powder layer may be irradiated at the same time that the build unit is moving, which would allow for continuous operation of the build unit and thus faster production of the object.

Figure 4:
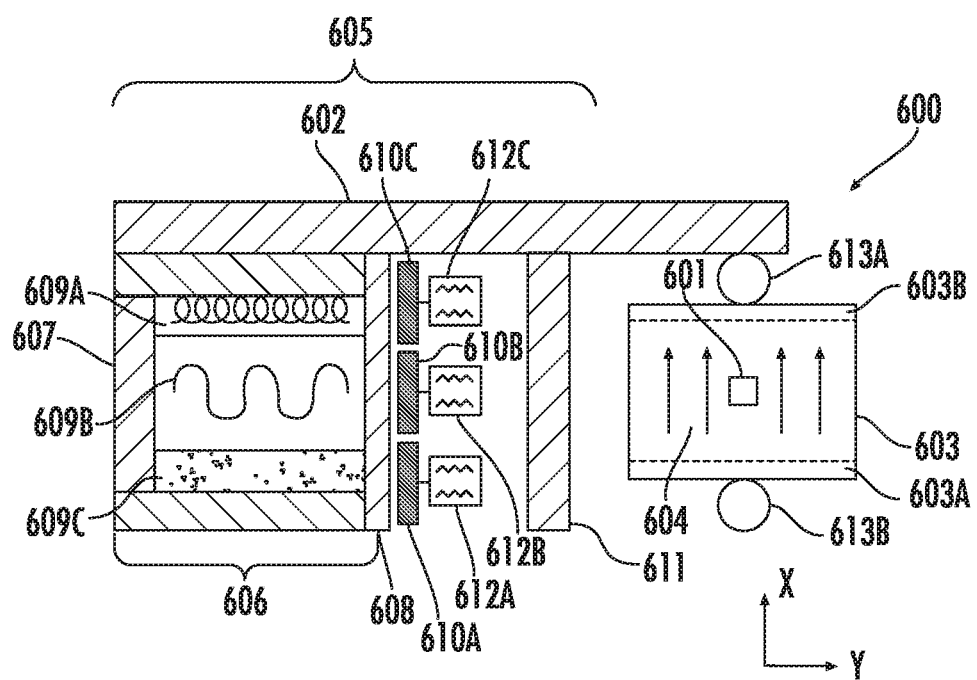
FIG. 4 shows a top view of a build unit according to an embodiment of the invention.

FIG. 4 shows a top down view of the build unit of FIG. 2. For simplicity, the object and the walls are not shown here. The build unit 600 has an irradiation emission directing device 601, an attachment plate 602 attached to the gasflow device 603, hopper 606, and recoater arm 611. The gasflow device has a gas outlet portion 603A and a gas inlet portion 603B. Within the gasflow device 603 there is a gasflow zone 604. The gasflow device 603 provides laminar gas flow within the gasflow zone 604. There is also a recoater 605 with a recoater arm 611, actuating elements 612A, 612B, and 612C, and gate plates 610A, 610B, and 610C. The recoater 605 also has a hopper 606 with a back plate 607 and front plate 608. In this particular illustration of one embodiment of the present invention, the hopper is divided into three separate compartments containing three different materials 609A, 609B, and 609C. There are also gas pipes 613A and 613B that feed gas out of and into the gasflow device 603.

Figure 5:
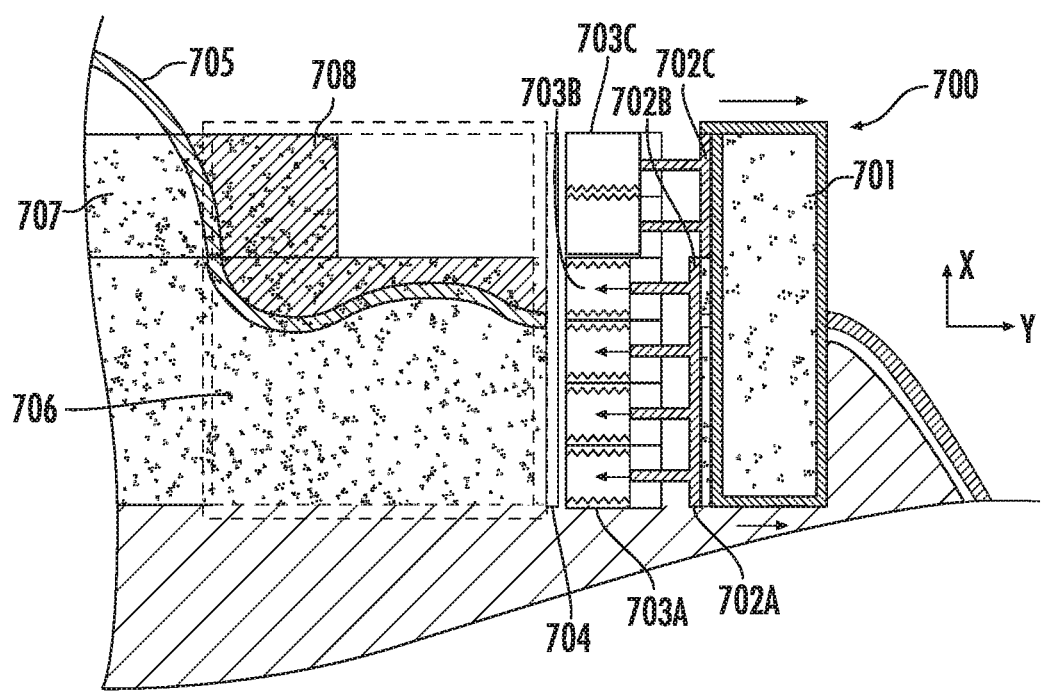
FIG. 5 shows a top view of a recoater according to an embodiment of the present invention.

FIG. 5 shows a top down view of a recoater according to one embodiment, where the recoater has a hopper 700 with only a single compartment containing a powder material 701. There are three gate plates 702A, 702B, and 702C that are controlled by three actuating elements 703A, 703B, and 703C. There is also a recoater arm 704 and a wall 705. When the recoater passes over a region that is within the wall, such as indicated by 707, the corresponding gate plate 702C may be held open to deposit powder in that region 707. When the recoater passes over a region that is outside of the wall, such as the region indicated as 708, the corresponding gate plate 702C is closed by its corresponding actuating element 703C, to avoid depositing powder outside the wall, which could potentially waste the powder. Within the wall 705, the recoater is able to deposit discrete lines of powder, such as indicated by 706. The recoater blade (not shown in this view) smooths out the powder deposited.

Advantageously, a selective recoater according to embodiments of the apparatus and methods described herein allows precise control of powder deposition using powder deposition device (e.g. a hopper) with independently controllable powder gates as illustrated, for example, in FIG. 4, 606, 610A, 610B, and 610C and FIG. 5, 702A, 702B, and 702C. The powder gates are controlled by at least one actuating element which may be, for instance, a bidirectional valve or a spring (as illustrated, for example, in FIG. 2, 409. Each powder gate can be opened and closed for particular periods of time, in particular patterns, to finely control the location and quantity of powder deposition (see, for example, FIG. 4). The hopper may contain dividing walls so that it comprises multiple chambers, each chamber corresponding to a powder gate, and each chamber containing a particular powder material (see, for example, FIG. 4, and 609A, 609B, and 609C). The powder materials in the separate chambers may be the same, or they may be different. Advantageously, each powder gate can be made relatively small so that control over the powder deposition is as fine as possible. Each powder gate has a width that may be, for example, no greater than about 2 inches, or more preferably no greater than about ¼ inch. In general, the smaller the powder gate, the greater the powder deposition resolution, and there is no particular lower limit on the width of the powder gate. The sum of the widths of all powder gates may be smaller than the largest width of the object, and there is no particular upper limit on the width of the object relative to the sum of the widths of the power gates. Advantageously, a simple on/off powder gate mechanism according to one embodiment is simpler and thus less prone to malfunctioning. It also advantageously permits the powder to come into contact with fewer parts, which reduces the possibility of contamination. Advantageously, a recoater according to an embodiment of the present invention can be used to build a much larger object. For example, the largest xy cross sectional area of the recoater may be smaller than the smallest cross sectional area of the object, and there is no particular upper limit on the size of the object relative to the recoater. Likewise, the width of the recoater blade may smaller than the smallest width of the object, and there is no particular upper limit on the width of the object relative to the recoater blade. After the powder is deposited, a recoater blade can be passed over the powder to create a substantially even layer of powder with a particular thickness, for example about 50 microns, or preferably about 30 microns, or still more preferably about 20 microns. Another feature of some embodiments of the present invention is a force feedback loop. There can be a sensor on the selective recoater that detects the force on the recoater blade. During the manufacturing process, if there is a time when the expected force on the blade does not substantially match the detected force, then control over the powder gates may be modified to compensate for the difference. For instance, if a thick layer of powder is to be provided, but the blade experiences a relatively low force, this scenario may indicate that the powder gates are clogged and thus dispensing powder at a lower rate than normal. Under these circumstances, the powder gates can be opened for a longer period of time to deposit sufficient powder. On the other hand, if the blade experiences a relatively high force, but the layer of powder provided is relatively thin, this may indicate that the powder gates are not being closed properly, even when the actuators are supposed to close them. Under these circumstances, it may be advantageous to pause the build cycle so that the system can be diagnosed and repaired, so that the build may be continued without comprising part quality. Another feature of some embodiments of the present invention is a camera for monitoring the powder layer thickness. Based on the powder layer thickness, the powder gates can be controlled to add more or less powder.

In addition, an apparatus according to an embodiment of the present invention may have a controlled low oxygen build environment with two or more gas zones to facilitate a low oxygen environment. The first gas zone is positioned immediately over the work surface. The second gas zone may be positioned above the first gas zone, and may be isolated from the larger build environment by an enclosure. For example, in FIG. 2 element 404 constitutes the first gas zone, element 419 constitutes the second gas zone contained by the enclosure 418, and the environment around the entire apparatus is the controlled low oxygen build environment. In the embodiment illustrated in FIG. 2, the first gasflow zone 404 is essentially the inner volume of the gasflow device 403, i.e. the volume defined by the vertical (xz plane) surfaces of the inlet and outlet portions (403A and 403B), and by extending imaginary surfaces from the respective upper and lower edges of the inlet portion to the upper and lower edges of the outlet portion in the xy plane. When the irradiation emission directing device directs a laser beam, then the gasflow device preferably provides substantially laminar gas flow across the first gas zone. This facilitates removal of the effluent plume caused by laser melting. Accordingly, when a layer of powder is irradiated, smoke, condensates, and other impurities flow into the first gasflow zone, and are transferred away from the powder and the object being formed by the laminar gas flow. The smoke, condensates, and other impurities flow into the low-pressure gas outlet portion and are eventually collected in a filter, such as a HEPA filter. By maintaining laminar flow, the aforementioned smoke, condensates and other impurities can be efficiently removed while also rapidly cooling melt pool(s) created by the laser, without disturbing the powder layer, resulting in higher quality parts with improved metallurgical characteristics. In an aspect, the gas flow in the gasflow volume is at about 3 meters per second. The gas may flow in either the x or y direction.

The oxygen content of the second controlled atmospheric environment is generally approximately equal to the oxygen content of the first controlled atmospheric environment, although it doesn't have to be. The oxygen content of both controlled atmospheric environments is preferably relatively low. For example, it may be 1% or less, or more preferably 0.5% or less, or still more preferably 0.1% or less. The non-oxygen gases may be any suitable gas for the process. For instance, nitrogen obtained by separating ambient air may be a convenient option for some applications. Some applications may use other gases such as helium, neon, or argon. An advantage of the invention is that it is much easier to maintain a low-oxygen environment in the relatively small volume of the first and second controlled atmospheric environments. In prior art systems and methods, the larger environment around the entire apparatus and object must be tightly controlled to have a relatively low oxygen content, for instance 1% or less. This can be time-consuming, expensive, and technically difficult. Thus it is preferable that only relatively smaller volumes require such relatively tight atmospheric control. Therefore, in the present invention, the first and second controlled atmospheric environments may be, for example, 100 times smaller in terms of volume than the build environment. The first gas zone, and likewise the gasflow device, may have a largest xy cross sectional area that is smaller than the smallest cross sectional area of the object. There is no particular upper limit on the size of the object relative to the first gas zone and/or the gasflow device. Advantageously, the irradiation emission beam (illustrated, for example, as 402 and 502) fires through the first and second gas zones, which are relatively low oxygen zones. And when the first gas zone is a laminar gasflow zone with substantially laminar gas flow, the irradiation emission beam is a laser beam with a more clear line of sight to the object, due to the aforementioned efficient removal of smoke, condensates, and other contaminants or impurities.

One advantage of the present invention is that, in some embodiments, the build plate may be vertically stationary (i.e. in the z direction). This permits the build plate to support as much material as necessary, unlike the prior art methods and systems, which require some mechanism to raise and lower the build plate, thus limiting the amount of material that can be used. Accordingly, the apparatus of the present invention is particularly suited for manufacturing an object within a large (e.g., greater than 1 m$^3$) build envelope. For instance, the build envelope may have a smallest xy cross sectional area greater than 500 mm$^2$, or preferably greater than 750 mm$^2$, or more preferably greater than 1 m$^2$. The size of the build envelope is not particularly limited. For instance, it could have a smallest cross sectional area as large as 100 m$^2$. Likewise, the formed object may have a largest xy cross sectional area that is no less than about 500 mm$^2$, or preferably no less than about 750 mm$^2$, or still more preferably no less than about 1 m$^2$. There is no particular upper limit on the size of the object. For example, the object's smallest xy cross sectional area may be as large as 100 m$^2$. Because the build envelope retains unfused powder about the object, it can be made in a way that minimizes unfused powder (which can potentially be wasted powder) within a particular build, which is particularly advantageous for large builds. When building large objects within a dynamically grown build envelope, it may be advantageous to build the envelope using a different build unit, or even a different build method altogether, than is used for the object. For example, it may be advantageous to have one build unit that directs an e-beam, and another build unit that directs a laser beam. With respect to the build envelope, precision and quality of the envelope may be relatively unimportant, such that rapid build techniques are advantageously used. In general, the build envelope may be built by any suitable means, for instance by Mig or Tig welding, or by laser powder deposition. If the wall is built by additive manufacturing, then a different irradiation emission directing device can be used to build than wall than is used to build the object. This is advantageous because building the wall may be done more quickly with a particular irradiation emission directing device and method, whereas a slower and more accurate directing device and method may be desired to build the object. For example, the wall may be built from a rapidly built using a different material from the object, which may require a different build method. Ways to tune accuracy vs. speed of a build are well known in the art, and are not recited here.

Figure 6:
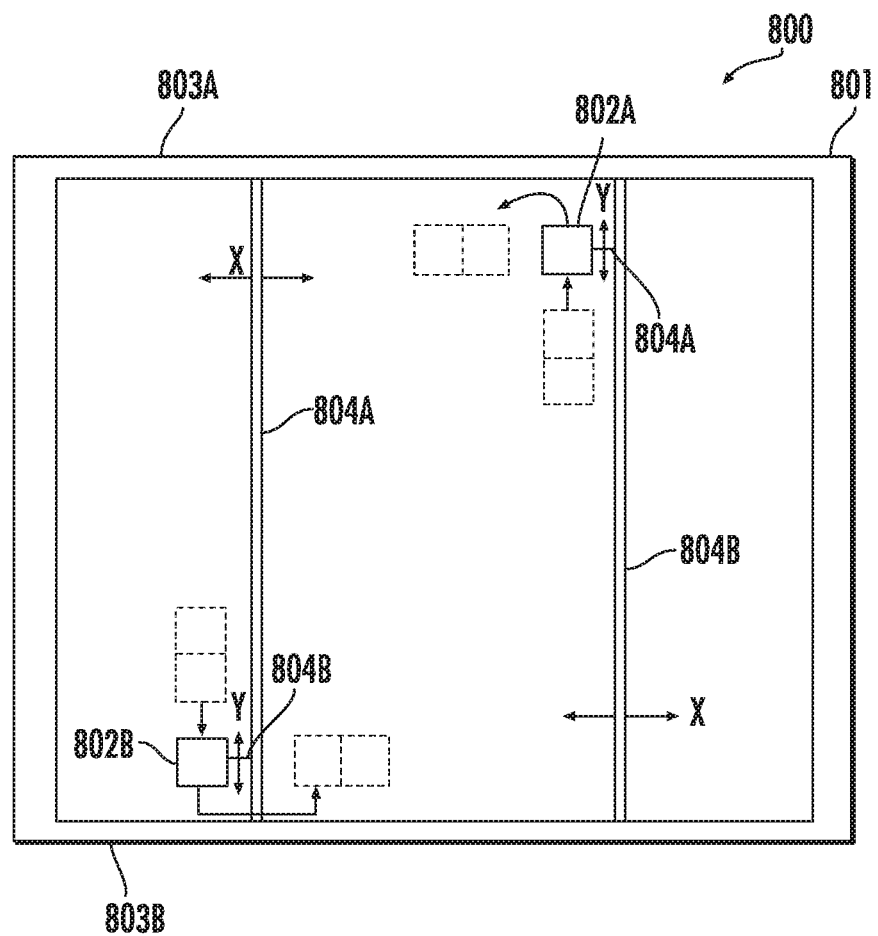
FIG. 6 illustrates a large scale additive manufacturing apparatus with two build units according to an embodiment of the present invention.

For example, as shown in FIG. 6, the systems and methods of the present invention may use two or more build units to build one or more object(s). The number of build units, objects, and their respective sizes are only limited by the physical spatial configuration of the apparatus. FIG. 6 shows a top down view of a large-scale additive manufacturing machine 800 according to an embodiment of the invention. There are two build units 802A and 802B mounted to a positioning system 801. There are z crossbeams 803A and 803B for moving the build units in the z direction. There are x crossbeams 804A and 804B for moving the build units in the x direction. The build units 802A and 802B are attached to the x crossbeams 804A and 804B by mechanisms 805A and 805B that move the units in the y direction. The object(s) being formed are not shown in this view. A build envelope (also not shown in this view) can be built using one or both of the build units, including by laser powder deposition. The build envelope could also be built by, e.g., welding. In general, any number of objects and build envelopes can be built simultaneously using the methods and systems of the present invention.

Figure 7:
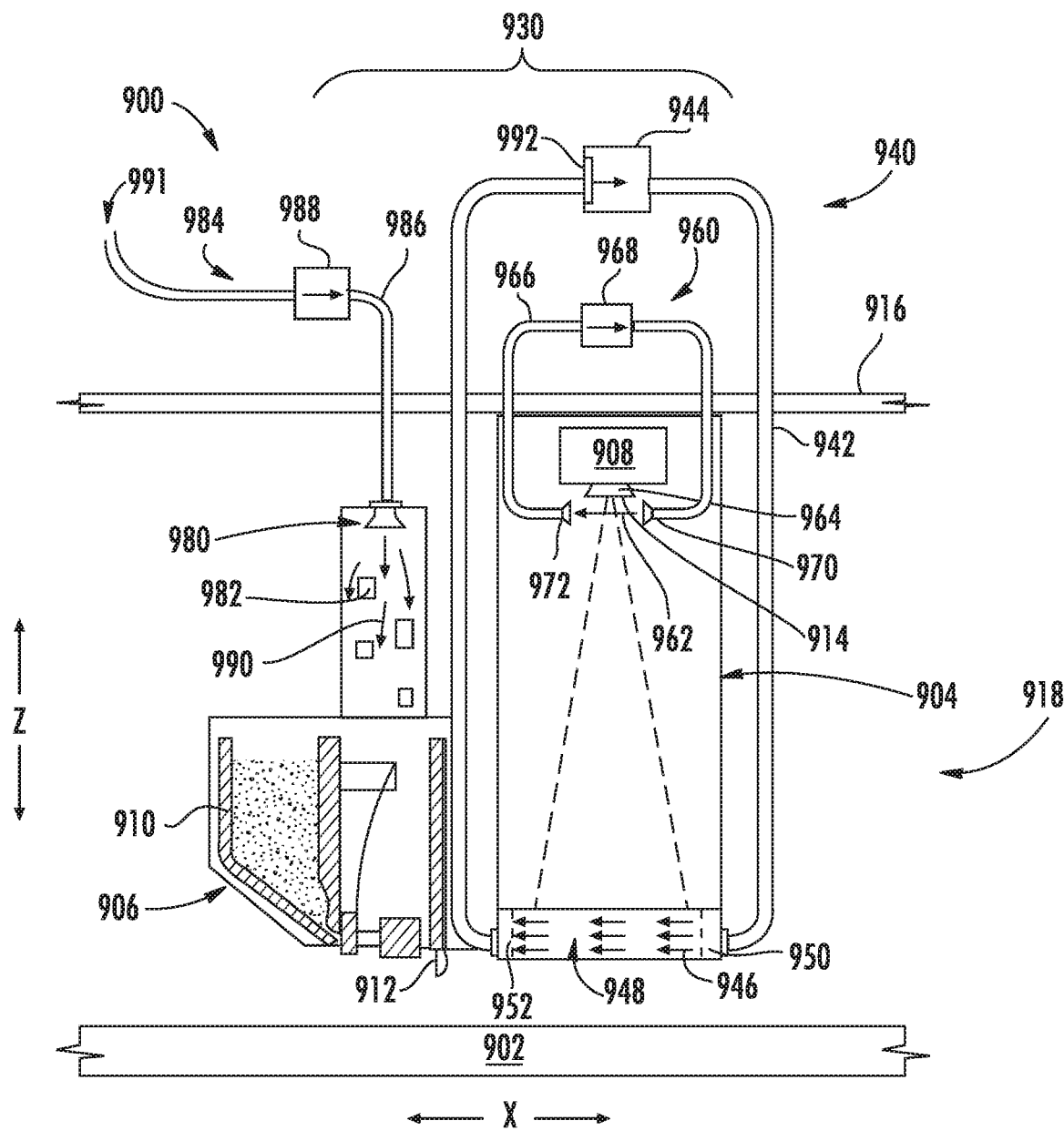
FIG. 7 illustrates a schematic view of a plurality of gas flow systems of an additive manufacturing machine according to an embodiment of the present invention.

Referring now to FIG. 7, an additive manufacturing machine 900 generally defines a vertical or Z-direction and a horizontal plane defined perpendicular to the Z-direction (also as defined, e.g., by the X-direction and the Y-direction in FIG. 1). Build platform 902 extends within the horizontal plane to provide a surface for depositing layers of additive powder (not shown in FIG. 7), as described herein. In general, additive manufacturing machine 900 includes a build unit 904 that is generally used for depositing a layer of additive powder and fusing portions of the layer of additive powder to form a single layer of a component (not illustrated in FIG. 7). As described above, build unit 904 forms the component layer-by-layer by printing or fusing layers of additive powder as build unit 904 moves up along the vertical direction.

Build unit 904 generally includes a powder dispenser 906 for discharging a layer of additive powder and an energy source 908 for selectively directing energy toward the layer of additive powder to fuse portions of the layer of additive powder. For example, powder dispenser 906 may include a powder hopper 910, a system of gates (see, e.g., FIG. 4, 610A-C and FIG. 5, 702A-C), a recoater arm 912, and any other components which facilitate the deposition of smooth layers of additive powder on build platform 902 or a sub layer. In addition, "energy source" may be used to refer to any device or system of devices configured for directing an energy beam towards a layer of additive powder to fuse a portion of that layer of additive powder. For example, according to an exemplary embodiment, energy source may be an irradiation emission directing device and many include a scanner having a lens 914 for directing an energy beam.

As described above, build unit 904 is described as utilizing a direct metal laser sintering (DMLS) or direct metal laser melting (DMLM) process using an energy source to selectively sinter or melt portions of a layer of powder. However, it should be appreciated that according to alternative embodiments, additive manufacturing machine 900 and build unit 904 may be configured for using a "binder jetting" process of additive manufacturing. In this regard, binder jetting involves successively depositing layers of additive powder in a similar manner as described above. However, instead of using an energy source to generate an energy beam to selectively melt or fuse the additive powders, binder jetting involves selectively depositing a liquid binding agent onto each layer of powder. For example, the liquid binding agent may be a photo-curable polymer or another liquid bonding agent. Other suitable additive manufacturing methods and variants are intended to be within the scope of the present subject matter.

Notably, according aspects of the present subject matter, build unit 904 is supported by a gantry 916 that is positioned above build platform 902 and at least partially defines a build area 918. Notably, as used herein, "gantry" 916 may be intended to refer to the horizontally extending support beams and not the vertical support legs (not shown) that support the gantry 916 over the build platform 902. Although a gantry 916 is used to describe the support for build unit 904 herein, it should be appreciated that any suitable vertical support means can be used according to alternative embodiments. For example, build unit 904 may be attached to a positioning system such as a delta robot, a cable robot, a robot arm, a belt drive, etc. In addition, although build platform 902 is illustrated herein as being stationary, it should be appreciated that build platform 902 may move according to alternative embodiments. In this regard, for example build platform 902 may be configured for translating along the X-Y-Z directions or may rotate about one of these axes.

According to the illustrated embodiment, gantry 916 defines a build area 918 having a maximum build width (e.g., measured along the X-direction), build depth (e.g., measured along the Y-direction), and build height (measured along the vertical direction or Z-direction). Gantry 916 is generally configured for movably supporting build unit 904 within build area 918, e.g., such that build unit 904 may be positioned at any location (e.g., along X-Y-Z axes) within build area 918. Moreover, according to exemplary embodiments, gantry 916 may further be configured for rotating build unit about the X, Y, and Z axes. Thus, build unit 904 may be positioned and oriented in any suitable manner within build area 918 to perform an additive manufacturing process.

Referring still to FIG. 7, a schematic view of a gas flow system 930 of additive manufacturing machine 900 is provided according to an exemplary embodiment of the present subject matter. As shown, additive manufacturing machine 900 includes a variety of subsystems that may require a flow of gas or other fluid to achieve some function within that subsystem. Thus, as used herein, "subsystem" may be used to refer to any of these distinct systems within additive manufacturing machine 900 that require a flow of gas for particular function. In addition, gas flow system 930 may be used generally to refer to a plurality of gas circulation loops associated with each of these subsystems, examples of which are described below.

For purpose of explaining aspects of the present subject matter, three particular subsystems will be described herein. However, it should be appreciated that these three subsystems are used only for exemplary purposes and are not intended to limit the scope of the present subject matter. Moreover, these subsystems are only illustrated in schematic form and described generally to explain the configuration and operation of gas flow loops according to the present subject matter. The present subject matter is not intended to be limited to the particular subsystems, gas loops, or specific configurations described.

Additive manufacturing machine 900 may include a condensate evacuation subsystem 940 that is generally configured for removing condensate, effluent, and other byproducts generated by the additive manufacturing process proximate the powder bed. For example, as described briefly above, when the additive powder is melted or sintered, a plume of gases, dust, particulates, or other byproducts may be generated. Notably, it is desirable to remove or evacuate these byproducts from the melting or sintering area for improved printing. As explained above, additive manufacturing machine 900 may thus include a gas flow system for urging a flow of gas above and parallel to the powder bed to remove such byproducts. According to the illustrated embodiment of FIG. 7, this gas flow system is condensate evacuation subsystem 940.

Condensate evacuation subsystem 940 includes a condensate loop 942 and a first gas circulation device 944 operably coupled to condensate loop 942 for circulating a first gas 946 through build area 918 proximate build platform 902 or sublayer of additive powder. In this regard, for example, condensate loop 942 is a substantially closed loop of conduit, pipe, or tubing through which first gas 946 may be circulated. Condensate loop 942 may define an open portion or evacuation region 948 proximate the powder bed within build area 918 for drawing in condensate and other byproducts.

More specifically, according to the illustrated embodiment, condensate loop 942 defines a discharge port 950 and a suction port 952 positioned on opposite sides of build unit 904 and evacuation region 948 along a horizontal direction. In this manner, as first gas circulation device 944 circulates first gas 946 through condensate loop 942, the flow of first gas 946 exits from discharge port 950 and travels proximate and substantially parallel to a surface of the powder bed to collect condensate, smoke, fumes, etc. The flow of first gas 946 is then drawn in through suction port 952 where it is recirculated through condensate loop 942. According to an exemplary embodiment, the flow of first gas 946 is substantially laminar, although first gas circulation device 944 can also create a turbulent flow if so desired.

Although discharge port 950 and suction port 952 are illustrated as being positioned on opposite sides of build unit 904 and evacuation region 948, it should be appreciated that other positions and orientations of condensate loop 942 may be used according to alternative embodiments. For example, according to another embodiment, discharge port 950 may be positioned above the work surface, e.g., proximate energy source 908. Discharge port 950 may urge a flow of first gas 946 down into evacuation region 948. In such an embodiment, suction port 952 may be defined around the sides of evacuation region 948 for drawing in and circulating the flow of first gas 946. Indeed, any suitable number, size, and positioning of discharge ports 950 and suction ports 952 that generate a flow of first gas 946 through evacuation region 948 may be possible and within the scope of the present subject matter.

Additive manufacturing machine 900 may further include a closed loop subsystem 960 which is generally configured for urging a flow of purge air 962 over one or more sensitive components 964 of additive manufacturing machine 900. As used herein, "sensitive component" is used to refer to one or more components in additive manufacturing machine 900 that require frequent cleaning for contaminant removal processes to ensure efficient and continuous operation of additive manufacturing machine 900. Closed loop subsystem 960 is generally configured for urging the flow of purge air 962 over such sensitive components 964 to continuously or intermittently blow off or remove dust, dirt, debris, or other contaminants which would otherwise deteriorate continuous operation of additive manufacturing machine 900.

As illustrated, closed loop subsystem 960 generally includes a purge air loop 966 and a second gas circulation device 968 operably coupled to purge air loop 966 for circulating a second gas (or the flow of purge air 962) over at least one sensitive component 964 of additive manufacturing machine 900. Similar to the condensate loop 942 of the condensate evacuation subsystem 940, purge air loop 966 is generally a substantially closed loop that circulates the flow of second gas 962 to sensitive component 964 and may include a purge air discharge port 970 and a purge air suction port 972. In this regard, purge air discharge port 970 may be a nozzle for ejecting the flow of second gas 962 onto and over sensitive component 964 to clean sensitive component 964. To maintain a substantially sealed and closed system, a negative pressure may be generated by purge air suction port 972 downstream of sensitive component 964 to draw in some or all of the flow of second gas 962 along with all contaminants blown off or removed from sensitive component 964. Second gas circulation device 968 may continually urges the flow of second gas 962 over such sensitive components 964, e.g., to ensure they remain clean for proper operation of additive manufacturing machine 900.

According to an exemplary embodiment of the present subject matter, the at least one sensitive component 964 is a beam, sliding interface, or bearing assembly of gantry 916 of additive manufacturing machine 900. In this regard, gantry 916 includes many components for ensuring precise and repeatable positioning of build unit 904. For example, gantry 916 may include multiple sliding or rotating components connected by bearings. If dust or debris gets in the bearings, the motion of gantry 916 (and thus build unit 904) may be affected, thereby introducing imprecision in the additive manufacturing process. Thus, purge air loop 966 is positioned and oriented for discharging a flow of second gas 962 over the bearings or other mating components of gantry 916 as well as drawing in the contaminated gas flow and recirculating that flow to continually remove dust and debris.

According still another embodiment, the at least one sensitive component 964 is a scanner or energy source 908 of build unit 904 and purge air loop 966 is positioned and oriented for circulating the flow of second gas 962 over lens 914 of energy source 908. In this regard, for example, the laser or electron beam of build unit 904 may include a series of mirrors and lenses or other components which are used to focus energy beam onto the powder. Dust, debris, and other contaminants may naturally fall onto such components during the process, resulting in an imprecise beam of energy (and thus imprecise fusing of powders). Closed loop subsystem 960 may thus be configured for removing such contaminants prior to performance degradation.

Although FIG. 7 illustrates purge air loop 966 as directing the flow of second gas 962 over lens 914 for removing contaminants, it should be appreciated that closed loop subsystem 960 may include any suitable number of purge air loops for purging any component of additive manufacturing machine 900. For example, closed loop subsystem 960 may include a first purge air loop for cleaning lens 914, a second purge air loop for cleaning a gantry beam, and a third purge air loop for cleaning a gantry bearing. Each of these purge air loops may be operated simultaneously or independently. In addition, according to one embodiment, a single pump, filter, and distribution manifold may be used to distribute the flow of second gas 962 through one or more of these three purge air loops.

As illustrated in FIG. 7, closed loop subsystem 960 includes a dedicated purge air loop 966 and second gas circulation device 968. In this regard, closed loop subsystem 960 defines a recirculating, closed purge air loop for cleaning sensitive components 964. However, it should be appreciated that according to alternative embodiments, closed loop subsystem 960 could be merged with or share components with another subsystem, such as condensate evacuation subsystem 940. In this regard, for example, second gas circulation device 968 could be removed and purge air loop 966 could be operably coupled with first gas circulation device 944 for receiving the flow of purge air 962. According to still other embodiments, closed loop subsystem 960 could be a positive pressure subsystem, e.g., including a fresh air supply or intake (similar to intake 991 described below) for drawing in air at a relatively low pressure and pressurizing that air such that the flow of purge air 962 has a high pressure relative to the air drawn in through the intake.

Referring still to FIG. 7, additive manufacturing machine 900 may further include an electronics compartment 980 that contains some or all of electronic components 982 of additive manufacturing machine 900. Notably, it may be frequently desirable to provide a flow of gas or air into electronics compartment 980 in order to prevent overheating electronic components 982 and/or to clean electronic components 982 from dust build-up. Thus, according to an example embodiment, additive manufacturing machine 900 further includes an electronics cooling subsystem 984.

Electronics cooling subsystem 984 includes a cooling loop 986 in fluid communication with electronics compartment 980 and a third gas circulation device 988 operably coupled with cooling loop 986 for urging a flow of third gas 990 through electronics compartment 980. By urging the flow of third gas 990 through electronics compartment 980, excess heat, dust, and/or debris are removed from electronics compartment 980, thereby extending the life of electronic components 982 of additive manufacturing machine 900.

According to the illustrated embodiment, third gas circulation device 988 includes an intake 991 that is positioned within the machine enclosure or an ambient environment for drawing in air at a relatively low pressure and pressurizing that air such that the flow of third gas 990 has a high pressure relative to the air drawn in through intake 991. In this manner, the generally positive pressure generated within electronics compartment 980 prevents powder and contaminants from entering electronics compartment 980 and facilitates cooling of electronic components 982.

Notably, in each of the subsystems 940, 960, 984 described herein, various condensate, dust, debris, additive powders, and other byproducts or particulates are collected by the flows of gas 946, 962, 990 performing its various functions. Because the gas is continuously circulated, it may be desirable to remove such contaminants from the respective flow of gas. In this regard, for example, each subsystem may include any suitable type or number of filters or mechanisms for extracting the contaminants from the flows of gas. For example, condensate evacuation subsystem 940 may further include a filter 992, such as a HEPA filter, for capturing the collected byproducts of the additive manufacturing process before passing the flow of first gas 946 back through build area 918. Closed loop subsystem 960 and electronics cooling subsystem 984 may similarly include a filter 992 or other means for extracting contaminants.

Additionally, according to alternative embodiments, each subsystem 940, 960, 984 may include an open or closed cooling system that is configured to remove heat from the flows of gas 946, 962, 990. A heat exchanger (not shown) may be utilized with gas flow loops 942, 966, 986 so as to control the temperature of the gases flowing therethrough. Various conduits, pumps, valves, and/or tanks may be included within the subsystems as needed or desired.

Notably, by having three different subsystems, the flows gas and their respective properties within the systems can be different or customizable to the needs of each subsystem. For example, according to an exemplary embodiment, first gas 946, second gas 962, and third gas 990 are all different gases. For example, according to an exemplary embodiment, each of the first, second, and third gas are selected from an inert gas (e.g., nitrogen, argon, etc.), air, water, and/or other suitable organic chemical (e.g., ethylene glycol, diethylene glycol, or propylene glycol). Alternatively, electronics compartment 980 could be cooled simply by using ambient air.

In addition, by using a separate closed system and circulation device for each subsystem, the flow rates and pressures of the flows of gas in each subsystem may be varied and customized depending on the needs of the particular application. To achieve the variable flow rates and pressures, each subsystem may include a dedicated gas circulation device. Notably, the circulation device may be any machine or device configured for urging a flow of gas, such as a compressive pump, a blower, or any other suitable forced gas supply source. Thus, for example, first gas 946, second gas 962, and third gas 990 may all have different pressures, and all may be greater than an atmospheric pressure in the environment where additive manufacturing machine 900 is located.

Therefore, in operation, according to one embodiment, to achieve a suitable condensate evacuation, condensate evacuation subsystem 940 urges the first flow of gas 946 at a relatively low-pressure and moderate flow rate to achieve a laminar flow. By contrast, in order to remove dirt and debris from sensitive components 964, closed loop subsystem 960 may urge the flow of purge air 962 at a relatively low flow rate but at high pressure. Electronics cooling subsystem 984 may also urge the flow of third gas 990 at a high flow rate for quickly removing excessive heat from electronics compartment 980. It should be appreciated that these flow rates are only exemplary and intended to illustrate the versatility of using three independent subsystems to control the flows of gas. The examples used herein are not intended to limit the scope of the present subject matter.

Figure 8:
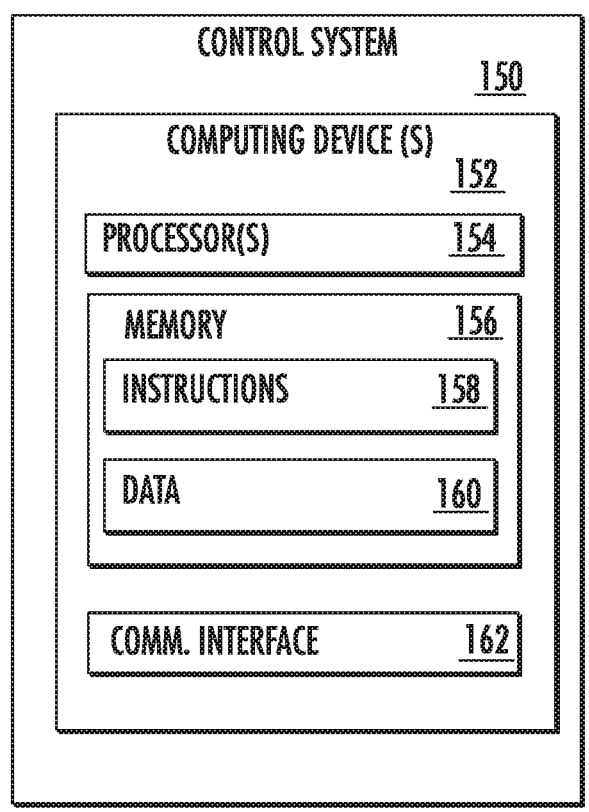
FIG. 8 shows an exemplary control system for use with an additive manufacturing machine and gas flow system according to an embodiment of the invention.

FIG. 8 depicts a block diagram of an example control system 150 that can be used to implement methods and systems according to example embodiments of the present disclosure, particularly the operation of additive manufacturing machine 900 and gas flow system 930. In this regard, for example, control system 150 may be configured for regulating the operation of gas circulation devices 944, 968, and/or 988. Control system 150 may be a dedicated controller of gas flow system 930 or may be a primary controller of additive manufacturing machine 900. The control system 150 may be positioned in a variety of locations throughout additive manufacturing machine 900.

As shown, the control system 150 can include one or more computing device(s) 152. The one or more computing device(s) 152 can include one or more processor(s) 154 and one or more memory device(s) 156. The one or more processor(s) 154 can include any suitable processing device, such as a microprocessor, microcontroller, integrated circuit, logic device, or other suitable processing device. The one or more memory device(s) 156 can include one or more computer-readable media, including, but not limited to, non-transitory computer-readable media, RAM, ROM, hard drives, flash drives, or other memory devices.

The one or more memory device(s) 156 can store information accessible by the one or more processor(s) 154, including computer-readable instructions 158 that can be executed by the one or more processor(s) 154. The instructions 158 can be any set of instructions that when executed by the one or more processor(s) 154, cause the one or more processor(s) 154 to perform operations. The instructions 158 can be software written in any suitable programming language or can be implemented in hardware. In some embodiments, the instructions 158 can be executed by the one or more processor(s) 154 to cause the one or more processor(s) 154 to perform operations, such as the operations for controlling gas flow system 930 or otherwise operating additive manufacturing device 900.

The memory device(s) 156 can further store data 160 that can be accessed by the one or more processor(s) 154. For example, the data 160 can include any data used for operating gas flow system 930 and/or additive manufacturing machine 900, as described herein. The data 160 can include one or more table(s), function(s), algorithm(s), model(s), equation(s), etc. for operating gas flow system 930 and/or additive manufacturing machine 900 according to example embodiments of the present disclosure.

The one or more computing device(s) 152 can also include a communication interface 162 used to communicate, for example, with the other components of system. The communication interface 162 can include any suitable components for interfacing with one or more network(s), including for example, transmitters, receivers, ports, controllers, antennas, or other suitable components.

Now that the construction and configuration of additive manufacturing machine 900 and gas flow system 930 according to an exemplary embodiment of the present subject matter has been presented, an exemplary method 1000 for operating an additive manufacturing machine according to an exemplary embodiment of the present subject matter is provided. Method 1000 can be used by a manufacturer or customer to operate additive manufacturing machine 900, or any other suitable additive manufacturing machine or assembly. It should be appreciated that the exemplary method 1000 is discussed herein only to describe exemplary aspects of the present subject matter, and is not intended to be limiting.

Figure 9:
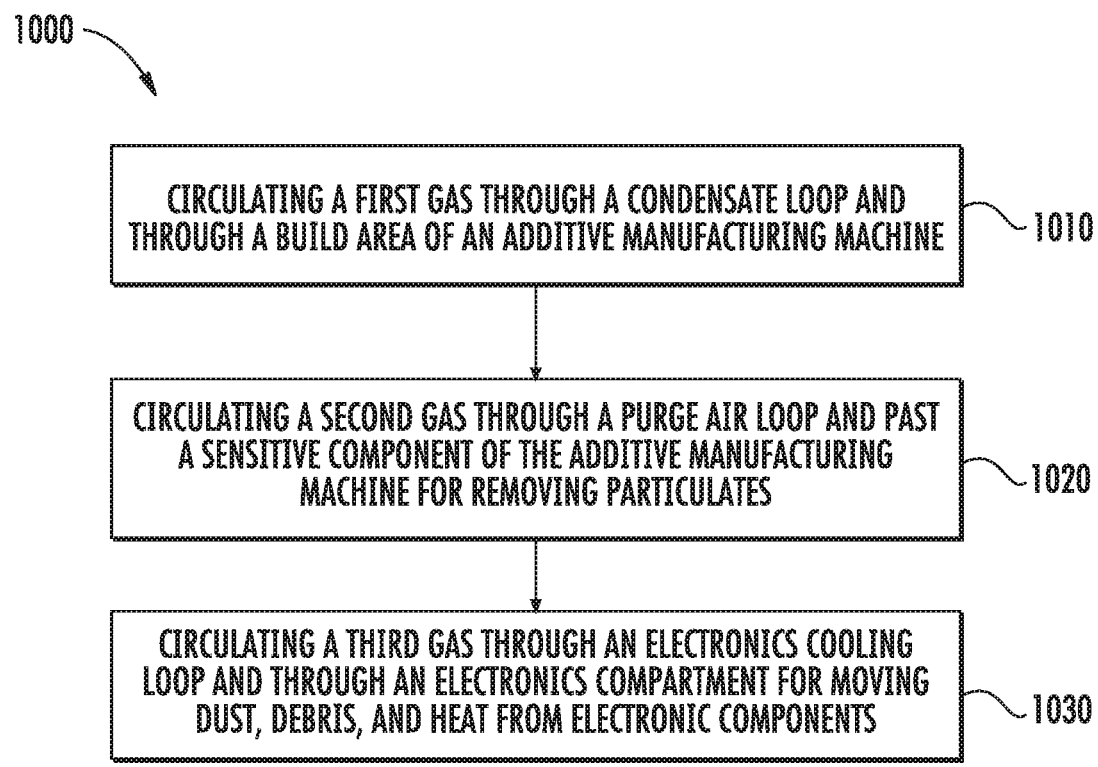
FIG. 9 shows a diagram of an exemplary method of one embodiment of the present invention.

Referring now to FIG. 9, method 1000 includes, at step 1010, circulating a first gas through a condensate loop and through a build area of the additive manufacturing machine. Step 1020 may include circulating the second gas through a purge air loop and past a sensitive component of the additive manufacturing machine. In addition, step 1030 may include circulating a third gas through an electronics cooling loop and through an electronics compartment for moving dust, debris, and heat from electronic components.

Although three separate subsystems and methods of operating subsystems are described herein, it should be appreciated that any other subsystem may be used to provide a flow of gas from any other function within additive manufacturing machine. In addition, one or more of the subsystems may function simultaneously with the other systems. In addition, although each subsystem is illustrated herein as having a single, substantially closed loop and a dedicated circulation device, it should be appreciated that each subsystem may include multiple loops, may include multiple pumps, or may share a pump with another subsystem. Other configurations are possible and within the scope of the present subject matter.

FIG. 9 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of method 1000 are explained using additive manufacturing machine 900 as an example, it should be appreciated that these methods may be applied to operate any suitable additive manufacturing machine.

The gas flow system described herein includes multiple gas loops for circulating gas to one or more subsystems within the additive manufacturing machine. Notably, each gas loop may contain a different gas or fluid, at any suitable pressure or flow rate, and may be supplied to or circulated over any suitable part or component of additive manufacturing machine. In this manner, gas flow system includes customizable and dedicated gas flow loops to meet all machine needs for improved performance and operation. By having dedicated gas flow loops for each of the subsystems, the amount of fresh gas needed within all of the subsystems may be reduced relative to a single gas loop system performing all functions. In addition, the pump type and capacity, as well as the filter or filter systems required for each gas flow loop may be tuned and customized for that specific loop, thus extending their life and improving their operation. Thus, the performance of the additive manufacturing machine may be improved and its operating costs reduced.

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An additive manufacturing machine, comprising:
   a build platform;
   a build unit;
   a gantry positioned above the build platform and movably supporting the build unit within a build area;
   a condensate evacuation subsystem comprising a condensate loop and a first gas circulation device operably coupled to the condensate loop for circulating a first gas through the build area proximate the build platform from a first discharge port to a first suction port; and
   a closed loop subsystem comprising a purge air loop and a second gas circulation device operably coupled to the purge air loop for circulating a second gas over at least one sensitive component of the additive manufacturing machine from a second discharge port to a second suction port.

2. The additive manufacturing machine of claim 1, further comprising:
   an electronics compartment containing electronic components; and
   an electronics cooling subsystem comprising a cooling loop in fluid communication with the electronics compartment and a third gas circulation device operably coupled with the cooling loop for circulating a third gas through the electronics compartment to cool the electronic components.

3. The additive manufacturing machine of claim 1, wherein the condensate loop defines a discharge port and a suction port, the discharge port and the suction port being positioned proximate a work surface for circulating the first gas over the work surface.

4. The additive manufacturing machine of claim 1, wherein the first gas and the second gas are different gases.

5. The additive manufacturing machine of claim 1, wherein the first gas and the second gas are either argon gas or nitrogen gas.

6. The additive manufacturing machine of claim 1, wherein the first gas and the second gas have different pressures greater than an atmospheric pressure.

7. The additive manufacturing machine of claim 1, wherein the first gas is circulated at a lower pressure and a higher flow rate than the second gas.

8. The additive manufacturing machine of claim 1, wherein at least one of the condensate evacuation subsystem and the closed loop subsystem comprises a filter.

9. The additive manufacturing machine of claim 1, wherein the first gas circulation device and the second gas circulation device are either a compressive pump or a blower.

10. The additive manufacturing machine of claim 1, wherein the at least one sensitive component is the gantry, the purge air loop being positioned and oriented for circulating the second gas over the gantry.

11. The additive manufacturing machine of claim 1, wherein the at least one sensitive component is a scanner of the build unit, the purge air loop being positioned and oriented for circulating the second gas over a lens of the scanner.

12. The additive manufacturing machine of claim 1, wherein the condensate evacuation subsystem generates a substantially laminar flow of the first gas proximate and parallel to a powder bed.

13. The additive manufacturing machine of claim 2, wherein the third gas is circulated at a higher flow rate than the first gas and the second gas.

14. The additive manufacturing machine of claim 2, wherein the electronics cooling subsystem comprises a filter.

15. The additive manufacturing machine of claim 2, wherein the third gas is ambient air.

16. The additive manufacturing machine of claim 1, wherein the purge air loop defines a discharge port and a suction port, the discharge port and the suction port being positioned proximate the at least one sensitive component of the additive manufacturing machine.

17. The additive manufacturing machine of claim 16, wherein the discharge port is a nozzle for ejecting the second gas onto and over the at least one sensitive component of the additive manufacturing machine.

18. The additive manufacturing machine of claim 16, wherein the suction port draws in the second gas and contaminants removed from the at least one sensitive component of the additive manufacturing machine.

19. An additive manufacturing machine, comprising:
   a build platform;
   a build unit;
   a gantry positioned above the build platform and movably supporting the build unit within a build area;
   a condensate evacuation subsystem comprising a condensate loop and a first gas circulation device operably coupled to the condensate loop for circulating a first gas through the build area proximate the build platform from a first discharge port to a first suction port; and
   a purge air subsystem comprising a purge air loop and a second gas circulation device operably coupled to the purge air loop for circulating a second gas over at least one sensitive component of the additive manufacturing machine from a second discharge port to a second suction port, wherein the first gas and the second gas have at least one of a different flow rate or a different pressure.

* * * * *